United States Patent [19]

Koike et al.

[11] Patent Number: 4,547,047
[45] Date of Patent: Oct. 15, 1985

[54] MICROSCOPE TUBE SYSTEM

[75] Inventors: Takaharu Koike, Ina; Akio Taira, Hachiouji, both of Japan

[73] Assignee: Olympus Optical Co., Ltd., Tokyo, Japan

[21] Appl. No.: 361,254

[22] Filed: Mar. 24, 1982

[30] Foreign Application Priority Data

Mar. 25, 1981 [JP] Japan ................................. 56-42399

[51] Int. Cl.⁴ ............................................. G02B 21/20
[52] U.S. Cl. ..................................... 350/514; 350/286
[58] Field of Search ............... 350/502, 511, 514, 145, 350/286, 287

[56] References Cited

U.S. PATENT DOCUMENTS 4,008,946  2/1977  Tsuda et al. ......................... 350/511

FOREIGN PATENT DOCUMENTS 31-8187  9/1956  Japan ................................. 350/145
50-2561  1/1975  Japan .

Primary Examiner—John K. Corbin
Assistant Examiner—Lynn Vandenburgh Kent
Attorney, Agent, or Firm—Cushman, Darby & Cushman

[57] ABSTRACT

A microscope optical system wherein a light is made to enter a beam splitter of a Jentzch type prism through another surface than the front surface of the beam splitter in order to form a Jentzch type binocular optical system to be small and simple and to be able to obtain a high quality object image.

3 Claims, 3 Drawing Figures

MICROSCOPE TUBE SYSTEM

BACKGROUND OF THE INVENTION (a) Field of the Invention

This invention relates to a microscope optical system wherein a Jentzch type binocular system is used and more particularly to a microscope optical system wherein both observation and photographing can be made and, in the case of the photographing, a binocular optical system can be used as a view finder.

(b) Description of the Prior Art

FIG. 1 shows an optical system of a microscope wherein a conventional Jentzch type binocular optical system (formed of a Jentzch type prism, eyepiece and others) is used. In the formation of this kind of microscope, both observation and photographing can be made and, in the case of the photographing, the binocular optical system can be used as a view finder. That is to say, in FIG. 1, the reference numeral 1 denotes an objective, 2 denotes a relay lens, 3 denotes a reflecting prism for bending an optical axis, 4 denotes a projecting lens, 5 denotes a quick-return mirror, 6 denotes a film, 7 denotes a reflecting mirror, 8 denotes a relay lens, 9 denotes a reflecting prism for bending an optical axis, 10 denotes an observing direction changing prism, 11 denotes a Jentzch type binocular prism and 12 denotes an eyepiece. In this optical system, at the time of the observation, the reflecting prism 3 will be placed outside the light path, the light from the object will pass through the objective 1 and relay lens 2, will be reflected by the reflecting prism 9 and will enter the observing direction changing prism 10 and Jentzch type binocular prism 11. As shown in FIG. 2, this Jentzch type binocular prism 11 consists of a beam splitter 13 and binocular prisms 14 and 14'. Therefore, the light coming out of the observing direction changing prism 10 will enter the beam splitter 13 of the Jentzch type prism 11 and will be partly reflected and partly passed by its dividing surface 13a. The light reflected by the dividing surface 13a of the beam splitter 13 will come out of the side of the beam splitter 13, will enter the binocular prism 14', will be reflected by its reflecting surface, will be directed in the direction substantially parallel with the axis of the light entering the beam splitter 13 and will come out of the prism 14'. The light having passed through the dividing surface 13a of the beam splitter 13 will be reflected by the reflecting surface in front of the dividing surface, will be bent by substantially 90 degrees, will be projected out of the side surface of the beam splitter, will enter the binocular prism 14, will be reflected by its reflecting surface, will be directed in the direction substantially parallel with the axis of the light entering the beam splitter 13 and will be projected out of the prism 14. Therefore, the optical axes of the lights projected out of the binocular prisms 14 and 14' will be parallel with each other. Thus, the lights coming out of the binocular prisms 14 and 14' will be directed to be eyepiece 12 and the object image will be observed through the eyepiece 12. On the other hand, at the time of the photographing, when the reflecting prism 3 is inserted and the reflecting prism 9 is removed out of the light path, the light from the object will pass through the objective 1 and relay 2, will be reflected by the reflecting prism 3, will pass through the projecting lens 4, will be reflected by the quick-return mirror 5 and reflecting mirror 7, will be relayed by the relay lens 8 and will pass through the observing direction changing prisms 10 and Jentzch type prism 11, the object image will be observed through the eyepiece 12 and the eyepiece 12 will be used as a view finder. Here, if the quick-return mirror 5 is quickly turned to the chain line position, the image of the object will be formed on the film 6 and will be photographed.

In such conventional optical system as in the above, in the case of either of the observation and photographing, the light will be made to enter the binocular prism 11 (Jentzch type prism) through the observing direction changing prism 10 and therefore, there are so many surfaces by which the light is reflected that there have been defects that the picture quality is deteriorated by the light amount reduction and ghosts and that the assembly is difficult. Further, as the relay lens 2 is required, the formation will be complicated. As two prisms (or reflecting mirrors) must be arranged in the rear of the relay lens 2, the space for the arrangement will be necessary and the entire size will be large. Further, in case the magnification $\beta_2$ of the relay lens 2 is $\beta_2 > 1$, the prism and others arranged in the rear of the relay lens 2 will have to be made larger and therefore the size will be larger.

SUMMARY OF THE INVENTION

Therefore, a primary object of the present invention is to eliminate such defects as are mentioned above in this kind of microscope optical system.

According to the present invention, this object is attained by making a light enter a beam splitter of a Jentzch type prism through another surface than the front surface of the beam splitter.

According to a preferred formation of the present invention, the light from the object is made to enter the side surface adjacent to the front surface of the beam splitter so that this kind of microscope optical system which has less reflecting surfaces and is smaller in the size can be provided.

DESCRIPTION OF THE PREFERRED EMBODIMENT

Figure 3:
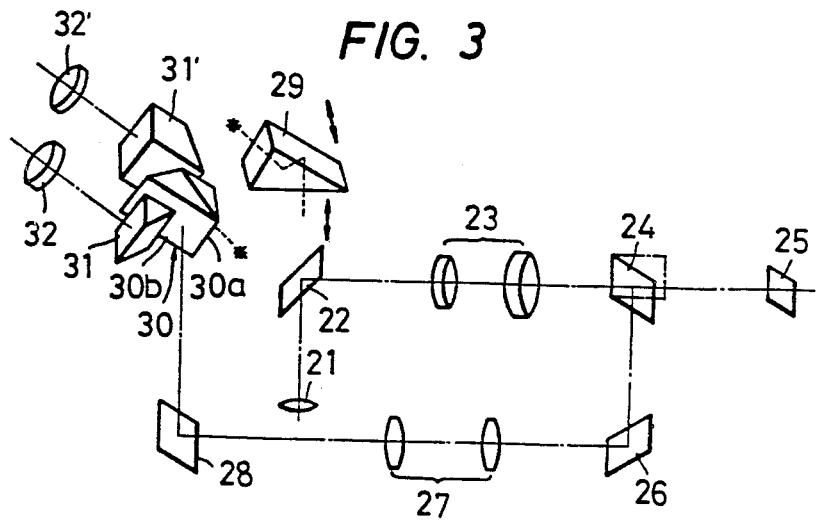
FIG. 3 is a view showing an optical system of a microscope in which a optical system according to the present invention is used.

The detailed substance of a optical system according to the present invention shall be explained on the basis of the embodiment shown in FIG. 3. In FIG. 3, the reference numeral 21 denotes an objective, 22 denotes a light path bending reflecting mirror, 23 denotes a projecting lens, 24 denotes a quick-return mirror, 25 denotes a film, 26 denotes a light path bending reflecting mirror, 27 denotes a relay lens, 28 denotes a light path bending reflecting mirror, 29 denotes an observing direction changing prism, 30 denotes a beam splitter 31 and 31' denote binocular prisms and 32 and 32' denote eyepieces.

In the optical system of the above formation, the light path bending reflecting mirror 22, projecting lens 23, quick-return mirror 24, light path bending reflecting mirror 26, relay lens 27, reflecting mirror 28 and beam splitter 30 are all arranged in substantially the same plane so that the light path to the beam splitter 30 through the projecting lens 23 and others from the light path bending reflecting mirror 22 may be substantially horizontal.

Figure 2:
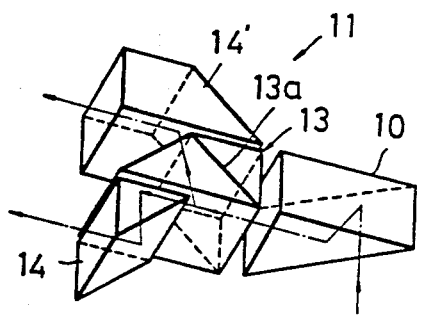
FIG. 2 is a perspective view of a Jentzch type prism.

In the optical system of such formation as in the above, in case the light path bending reflecting mirror 22 is placed within the light path and the observing direction changing prism 29 is without the light path as shown in FIG. 3, the light from the object will be converged by the objective 21, will be reflected by the reflecting mirror 22, will be bent in the substantially horizontal direction and will form a primary image between the light path bending reflecting mirror 22 and projecting lens 23. This primary image will be relayed by the projecting lens 23 and will be bent by the quick-return mirror 24 and reflecting mirror 26 and then a secondary image will be formed in a plane conjugate with the plane of the film 25. Further, this secondary image will be relayed by the relay lens 27 and the light will be bent by the reflecting mirror 28 and will enter the beam splitter 30 through the side surface 30b adjacent to the front surface 30a. Here, as the side surface 30b of the beam splitter 30 is formed to be substantially at right angles with the front surface 30a, the light bent by the reflecting mirror 28 will enter the beam splitter 30 substantially vertically to the surface 30b and therefore the optical axis of this incident light will be substantially at right angles with the optical axes of the eyepieces 32 and 32'. Thus the light from the object will reach the eyepieces 32 and 32' and will be observed and the eyepieces will be able to be used as a view finder. However, the passed light and reflected light have a relation exactly reverse to that of the conventional example (the part shown in FIG. 2). Here, when the quick-return mirror 24 is quickly turned to chain line position, the image of the object will be formed on the film surface 25 and will be able to be photographed.

On the other hand, in the case of only the observation, when the light path bending reflecting mirror 22 is removed out of the light path and, in its place, the observing direction changing prism 29 is inserted into the light path, the light from the object will pass through the objective 21 and observing prism 29, will enter the beam splitter 30 through the surface 30a, will pass through the beam splitter 30 and binocular prisms 31 and 31' and will be observed through the eyepieces 32 and 32'.

Figure 1:
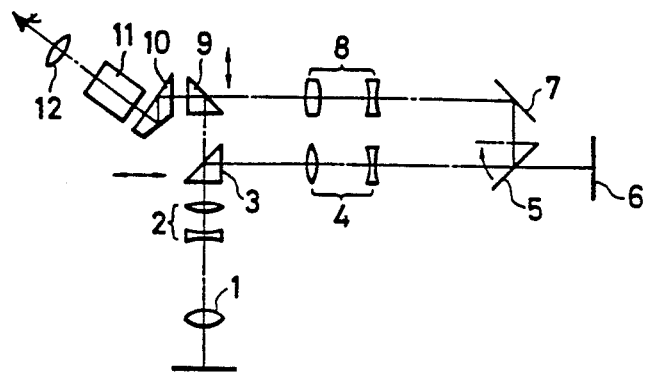
FIG. 1 is a view showing an optical system of a conventional microscope.

As explained above, in the optical system of the present invention, when the microscope having the Jentzch type binocular tube is so formed as to make the light enter the beam splitter in different directions respectively at the time of the observation and at the time of the photographing, the observation and photographing will be able to be switched over to each other by interchanging the reflecting mirror 22 and prism 29 with each other and, at the time of the photographing, the prism will not be required and the reflecting surfaces will be fewer. Further, as the reflecting mirror 22 and prism 29 can be inserted and removed in the same position, the distance between the prisms 3 and 9 in the conventional example (shown in FIG. 1) will not be required, the relay lens 2 also will not be required and therefore the system will be able to be made small in the size and particularly low in the height.

We claim:

1. A microscope optical system, comprising:

an objective lens;

a first reflecting means capable of being inserted into a light path to bend toward an eyepiece the light from an object which has passed through said objective lens;

a Jentzch type binocular prism consisting of a beam splitter having a side surface to receive the light bent toward said eyepiece by said first reflecting means and also having a front surface and a pair of prism members respectively arranged adjacent to said beam splitter and capable of reflecting the light divided by said beam splitter to lead said divided light to said eyepiece and arranged between said first reflecting means inserted into the light path and said eyepiece;

a second reflecting means capable of being inserted into the light path in place of said first reflecting means to bend in the substantially horizontal direction the light from the object which has passed through said objective lens;

a plurality of reflectors arranged in a substantially horizontal plane to cause to enter into said beam splitter, through a side surface thereof, said light bent in the substantially horizontal direction to lead said light bent in the substantially horizontal direction to said eyepiece;

a quick-return mirror being one of said reflectors and arranged so as to be able to be moved out of the light path to cause to enter onto an image-taking means said light bent in the substantially horizontal direction; and a relay lens system arranged between said beam splitter and one of said reflectors, said first reflecting means being inserted into the light path when an observation is to be effected, and said second reflecting means being inserted into the light path in place of said first reflecting means when a photographing is to be effected.

2. A microscope optical system according to claim 1, wherein:

said optical system further comprises:

a projecting lens arranged between said second reflecting means and said quick-return mirror, and said image-taking means is located at a position in which an object image is to be formed by said projecting lens.

3. A microscope optical system according to claim 1 wherein the front surface and side surface of the beam splitter intersect at right angles with each other.

* * * * *